United States Patent [19]

Suehara et al.

[11] Patent Number: 5,427,224
[45] Date of Patent: Jun. 27, 1995

[54] CONVEYING AND ALIGNING APPARATUS SUITABLE FOR LENS-FITTED PHOTOGRAPHIC FILM PACKAGES

[75] Inventors: Kazuyoshi Suehara; Toshihiro Matsushita; Masahi Saitoh; Toshiyuki Ogura, all of Kanagawa, Japan

[73] Assignee: Fuji Photo Film Co., Ltd., Kanagawa, Japan

[21] Appl. No.: 155,551

[22] Filed: Nov. 22, 1993

[30] Foreign Application Priority Data

Nov. 20, 1992 [JP] Japan ................................ 4-312412

[51] Int. Cl.⁶ .......................................... B65G 47/14
[52] U.S. Cl. .................................... 198/396; 198/443
[58] Field of Search ............... 198/396, 397, 443, 399, 198/620, 623, 626.1, 836.1, 658, 392, 671

[56] References Cited

U.S. PATENT DOCUMENTS

| | | |
|---|---|---|
| 3,158,255 | 11/1964 | Schnyder . |
| 3,815,730 | 6/1974 | Zwiep et al. ............... 198/397 X |
| 3,986,604 | 10/1976 | Siryj ............................. 198/395 |
| 4,187,545 | 2/1980 | Wallace et al. ................ 364/559 |
| 4,561,825 | 12/1985 | Sakata ........................... 414/753 |
| 4,747,480 | 5/1988 | Wodler et al. ............... 198/396 |
| 4,984,678 | 1/1991 | Fauchard ................ 198/396 X |
| 5,021,811 | 6/1991 | Maurinus et al. ............. 354/76 |
| 5,165,520 | 11/1992 | Hervé et al. ............. 198/396 X |

FOREIGN PATENT DOCUMENTS

| | | |
|---|---|---|
| 0317253 | 5/1989 | European Pat. Off. . |
| 1395855 | 2/1964 | France . |
| 2277751 | 7/1975 | France . |
| 2666315 | 3/1992 | France . |
| 2673165 | 8/1992 | France . |
| 4429098 | 11/1969 | Japan . |
| 6229195 | 6/1987 | Japan . |
| 3243930 | 10/1991 | Japan . |
| 4177230 | 6/1992 | Japan . |
| 930405 | 7/1963 | United Kingdom . |

OTHER PUBLICATIONS

Patents Abstracts of Japan, M-291, Apr. 20, 1984, vol. 8, No. 87, 59-004519, "Parts Feeder".

*Primary Examiner*—Cheryl L. Gastineau
*Attorney, Agent, or Firm*—Sughrue, Mion, Zinn, Macpeak & Seas

[57] ABSTRACT

An apparatus for conveying and aligning various types of film packages recovered for recycling. A conveyer of the apparatus is constructed by a pair of parallel belts combined to form a V-shaped bearing gutter and driven in the same conveying direction. The film packages are conveyed on the conveyer and are slid downward through an inclined cylindrical tube which rotates about the longitudinal axis and has spiral ridges on the inner periphery. Thereby, the longitudinal direction of the film packages are aligned with the conveying direction. Then a posture discriminator discriminates between the upright posture and the upside-down posture of the film packages on a first conveying path, based on the position of the viewfinder. The film packages having the upright posture are caused to fall headlong from the first conveying path onto a second conveying path, so as to have the upside-down posture on the second conveying path. The film packages conveyed on the first and second conveying paths are again joined together in a line.

12 Claims, 8 Drawing Sheets

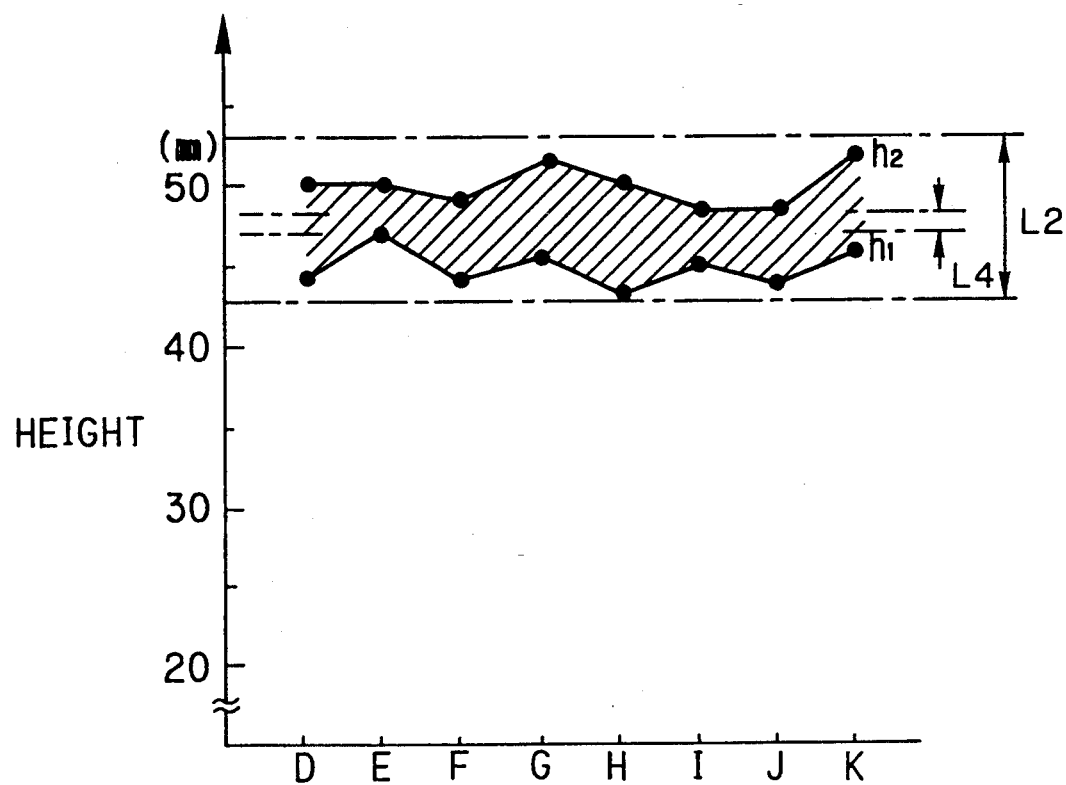
F I G. 10

CONVEYING AND ALIGNING APPARATUS SUITABLE FOR LENS-FITTED PHOTOGRAPHIC FILM PACKAGES

BACKGROUND OF THE INVENTION

1. Field of the Invention

The present invention relates to a conveyer and an aligning apparatus for various types of objects having substantially rectangular box shapes. The present invention relates particularly to an apparatus suitable for conveying and aligning used and recovered lens-fitted photographic packages to be fed to a disassembling process.

2. Description of the Related Art

A belt conveyer using a flat belt is capable of conveying a large number of objects at a high speed. Because the flat belt of the belt conveyer vibrates with the conveying movement, if objects are unstably loaded thereon at random posture, some objects may fall from the flat belt. To prevent the falling, fences are conventionally provided along the lateral sides of the flat belt.

A feeder which can automatically disperse a cluster of objects into individual pieces and feed the objects in series, has been disclosed, for example, in JPB 44-29098 and JPB 62-29195. Specifically, the former discloses a feeder which makes use of electromagnetic vibration and a specific resilient material for spacing objects. The latter publication discloses a feeder which uses a robot hand having a touch sensor so as to pick up an individual object from a plurality of objects.

Indeed, the flat belt conveyer having fences can rapidly and smoothly convey those objects which have same or approximately same shapes and dimensions, but the conventional flat belt conveyer cannot effectively convey a plurality of objects having different shapes and dimensions or those objects which are wrapped or encased with paper, film or the like. In such cases, a part of the object or a part of the wrapper may curled, and become jammed or trapped in a stationary portion of the belt conveyer, resulting in the need to interrupt operation of the conveyer.

The feeder using a robot hand can reliably pick up an individual piece from among a plurality of objects lying at random postures and orient the objects in the same direction. However, a robot hand feeder cannot reliably handle objects whose wrappers or cases are partly broken. Besides, the working speed of such a device is low. Electromagnetic vibration feeders are complicated in construction, and the running speed thereof cannot easily be controlled.

Meanwhile, various types of lens-fitted photographic film packages, hereinafter referred to as film packages, are now on the market. The film package is fundamentally constructed of a plastic resin package body loaded with film in factory. The package body is constituted of a main body section having a lens unit, a shutter unit and/or a printed circuit board thereon, and front and/or rear cover sections removably attached to the main body section. The package body is encased in a cardboard case, and the film package is used in this condition. After exposure of all available frames of the film, the film package is forwarded to a photofinishing laboratory where the exposed film is removed for developing and printing from the package body after breaking a part of the case.

Because of the increased need for reuse of industrial materials, it is desirable to recover the emptied package body along with the cardboard case for reuse. For example, JPA 3-243930, JPA 4-17730 and U.S. Pat. No. 5,021,811 disclose film packages or single-use cameras which are designed for recycling. However, because the used and recovered package bodies are mostly encased in the partly broken cardboard cases, and the film packages have different shapes and dimensions according to the type and the manufacturer, conventional feeders are not reliable in handling the recovered package bodies.

Furthermore, it is necessary, for automatic disassembling of the used package bodies, to uniformly orient the package bodies before the disassembling process. However, neither the above-described robot hand feeder nor other conventional aligning apparatus can discriminate between the upright posture and the upside-down posture of the film package. Therefore, it has been necessary to manually align the recovered film packages. This makes the recycling of the film packages labor intensive and expensive.

SUMMARY OF THE INVENTION

An object of the present invention is to provide a conveyer which is simple in construction and can effectively convey various types of objects.

Another object of the present invention is to provide an aligning apparatus for aligning objects of substantially rectangular box shape in the same longitudinal direction and/or with the same side up while conveying the objects at a high speed.

A further object of the present invention is to provide an apparatus for bringing a plurality of film packages lying at random posture into a line wherein each package has the same posture while continuously conveying the film packages.

To solve the above objects, a conveyer of the present invention has first and second bearing surfaces for bearing the objects thereon. The first and second bearing surfaces extend parallel to each other and are laterally inclined relative to horizontal to meet at respective lateral sides thereof at an angle, less than 180° for example.

An aligning apparatus of the invention for aligning objects having substantially rectangular box shapes into the same longitudinal direction has a cylindrical tube rotating about a longitudinal axis thereof. The tube is inclined to dispose a first end thereof at a higher position than a second end of the tube. The first end constitutes an entrance for receiving a plurality of the objects at random postures, the second end constitutes an exit for ejecting the objects. At least a ridge is formed on an internal peripheral surface of the tube and extends from the entrance to the exit, for guiding the objects along, while the objects slide downward through the rotating tube. This brings the longitudinal direction of each of the objects into alignment with the longitudinal direction of the tube.

An aligning apparatus for aligning a plurality of objects having substantially rectangular box shapes, in particular, film packages, with the same side up, has a first conveying path conveying the objects in series in a first direction and a discriminating device disposed on the first conveying path for discriminating between a first vertical posture and a second vertical posture relative to the first posture. An inverting device is disposed after the discriminating device for inverting those objects having the first posture to have the second posture by letting each object having the second posture fall headlong to one lateral side of the first conveying path. A second conveying path extends below the first conveying path to receive the objects from the first conveying path, and convey the inverted objects in the first direction. The second conveying path joins the first conveying path at a downstream position and a guide device is disposed in the downstream position for guiding each object conveyed on one of the first and second conveying paths into the other conveying path to bring the separately conveyed objects having the second posture into a line.

By combining the conveyer and the aligning apparatuses of the invention, a feeder suitable for feeding used and recovered film packages to a disassembling section is provided.

BRIEF DESCRIPTION OF THE DRAWINGS

Other objects and advantages of the present invention will become apparent in the following detailed description of the preferred embodiments when read in connection with the accompanying drawings, wherein like reference numerals designate like or corresponding parts throughout the several views, and wherein:

FIG. 10 is a graph for explaining the variation of viewfinders of different types of film packages in view of the vertical length and distance from the bottom of the film packages.

DESCRIPTION OF THE PREFERRED EMBODIMENT

Figure 1:
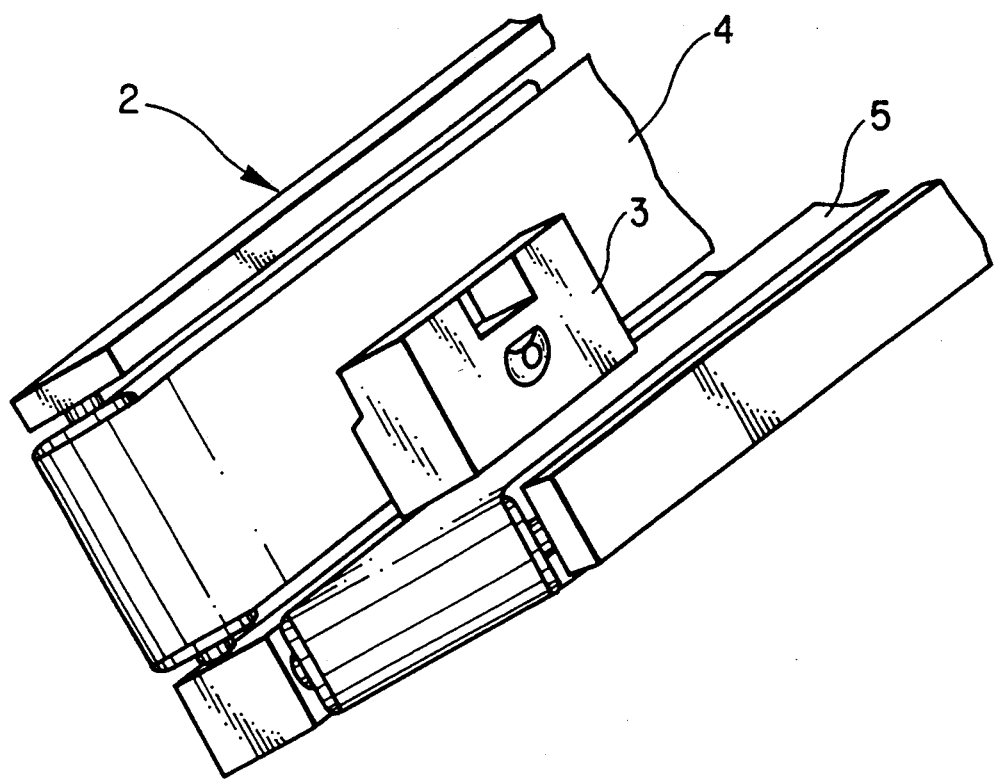
FIG. 1 is a perspective view of a conveyer having a V-shaped bearing gutter according to a preferred embodiment of the invention, with part broken away.
Figure 2:
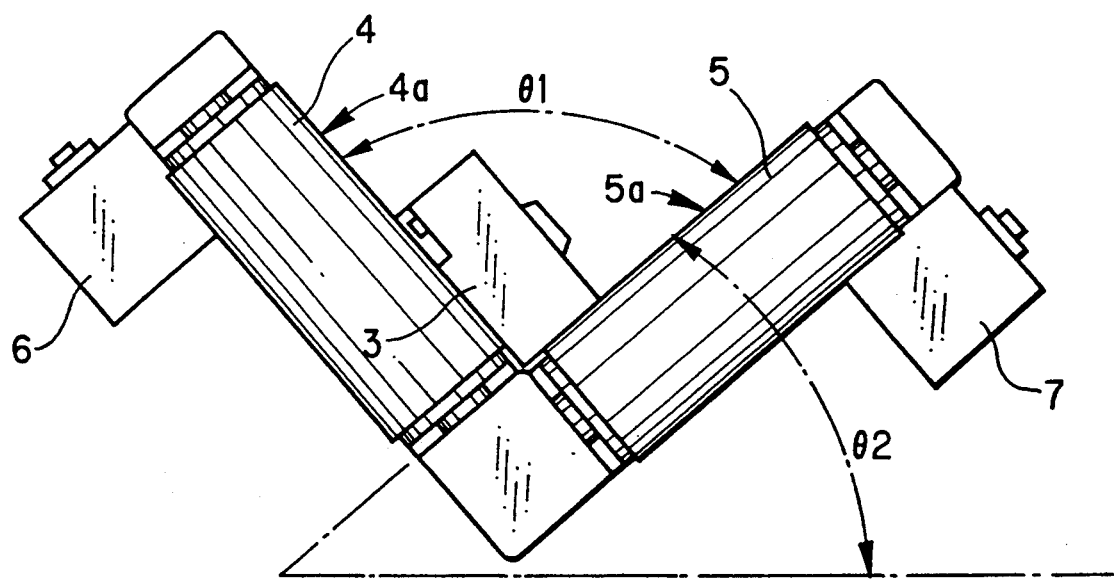
FIG. 2 is a view for explaining inclination angles of the bearing surfaces of the conveyer of FIG. 1.

FIGS. 1 and 2 illustrate a conveyer 2 having a pair of parallel flat belts 4 and 5 laterally inclined with respect to horizontal to form a V-shaped bearing gutter. The conveyer 2 conveys devices, for example used and recovered film packages from which exposed films have been removed, hereinafter referred to as units 3. Bearing surfaces 4a and 5a of the flat belts 4 and 5, on which the units 3 are borne, define an angle $\ominus 2$, for example 45°, with respect to the horizontal. Therefore, the units 3 are supported on the belts 4 and 5 at a bottom portion of the V-shaped bearing gutter.

The belts 4 and 5 are driven by respective drivers 6 and 7 such as motors, so that the conveying speed of the belts 4 and 5 can be controlled independently from each other and may be different from each other. If the conveying speeds of the belts 4 and 5 are to be equal, a single driver may be commonly used. In the present description, "flat belt" means any belt having a flat bearing surface. For example, the belt 4 or 5 may be a V-belt or a timing belt having a flat bearing surface, as opposed to a flat belt in the strict sense.

Since the unit 3 does not contact portions of the conveyer 2 other than the bearing surfaces 4a and 5a, jamming or curling of a part of the unit 3 such as a part of an outer cardboard case of the unit 3 will not occur. Therefore, it is possible to run the conveyer 2 without interruption.

The belts 4 and 5 may be made of rubber, fiber, resin, metal, or a composite of these materials, for example. It is possible to provide the bearing surfaces 4a and 5a of the belts 4 and 5 with a knurled surface defined by bosses, grooves, cross-strips or the like. Although the flat belts 4 and 5 shown in FIGS. 1 and 2 are identical in shape as well as in size, the belts may be different in size. Also, the shape of the belts may be different from each other if the conveyer has a curved or torsional path. In place of the flat belts 4 and 5, a pair of roller conveyers each consisting of many rollers may be used to obtain the same effect by arranging the bearing surfaces of the roller conveyers to form a V-shaped bearing gutter.

Figure 3:
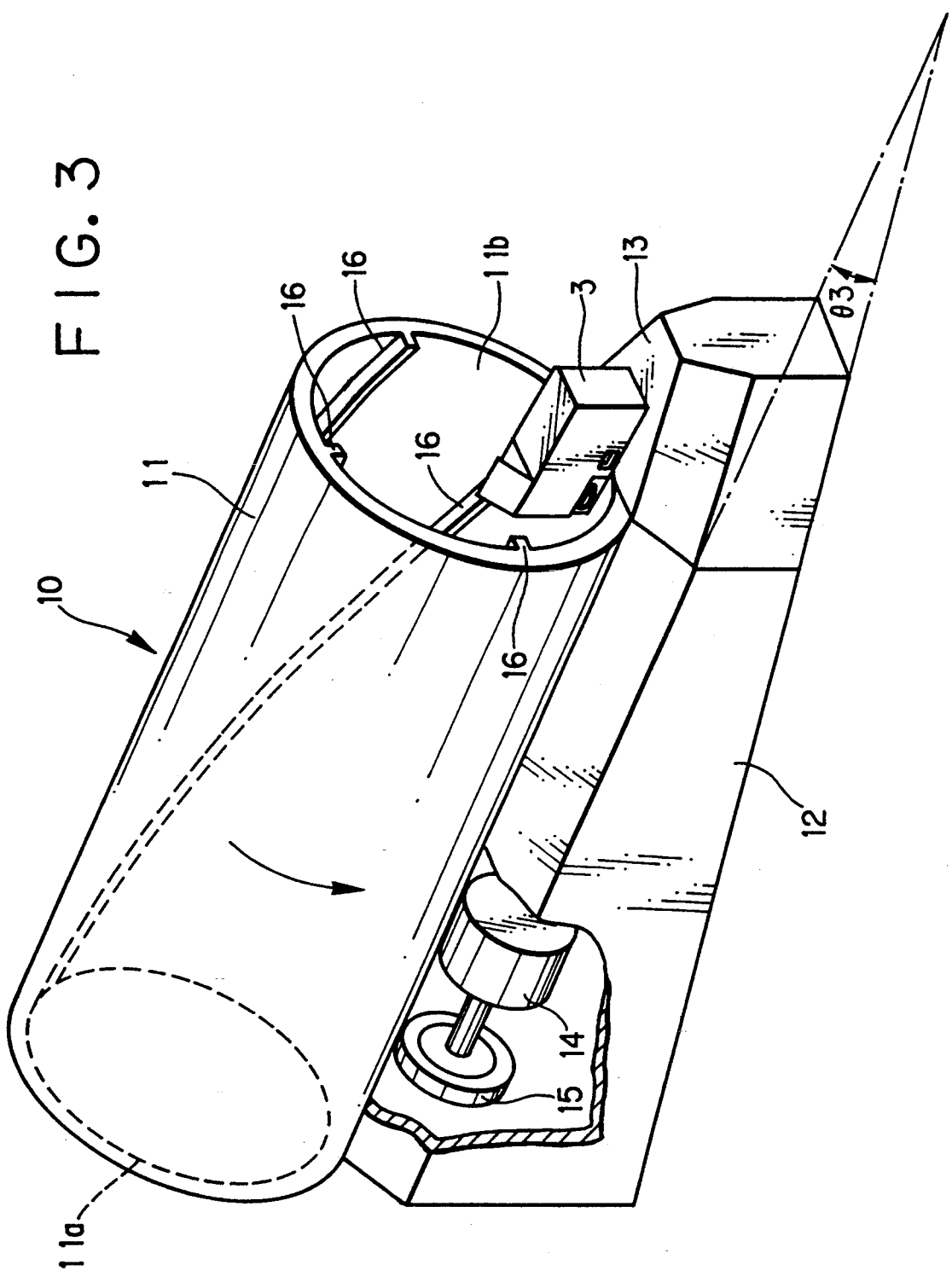
FIG. 3 is a perspective view, in partial section, of an aligning apparatus according to the preferred embodiment of the invention.

FIG. 3 shows an aligning apparatus for aligning the longitudinal direction of objects having a substantially rectangular box shape, for instance, the units 3. The aligning apparatus 10 has a cylindrical tube 11 having an entrance 11a for receiving the units 3 and an exit 11b for ejecting the units 3. The cylindrical tube 11 is rotatably mounted on a base portion 12 and is inclined at an angle $\ominus 3$ with respect to the horizontal, such that the entrance 11a is placed higher than the exit 11b. The base portion 12 has a sloped surface 13 at the exit 11b of the tube to receive the units 3 from the tube 11 and feed the same to the next process. A motor 14 is disposed in the base portion 12. The motor 14 drives a pulley 15 which presses against the outer periphery of the tube 11, to rotate the tube 11 in a direction shown by the arrow. Four parallel ridges 16 are formed on an inner peripheral surface of the tube 11. The ridges 16 extend in a spiral manner from the entrance 11a to the exit 11b of the tube 11.

According to this construction, the units 3 guided into the entrance 11a are guided along the spiral ridges 16 while sliding downward through the rotating tube 11, thereby to bring the longitudinal direction of the units 3 in the same sliding direction, that is, the longitudinal direction of the tube 11.

The number of the ridges 16 may be varied depending upon the size, weight, balance of the units 3, and the desirable throughput of the aligning apparatus 10. Also, the angle $\ominus 3$, length and rotational speed of the tube 11, and the shape of the ridge 16 may be varied in accordance with the objects to be aligned. The tube 11 may be made of metal, resin, concrete or a composite of these materials, for example.

Figure 4:
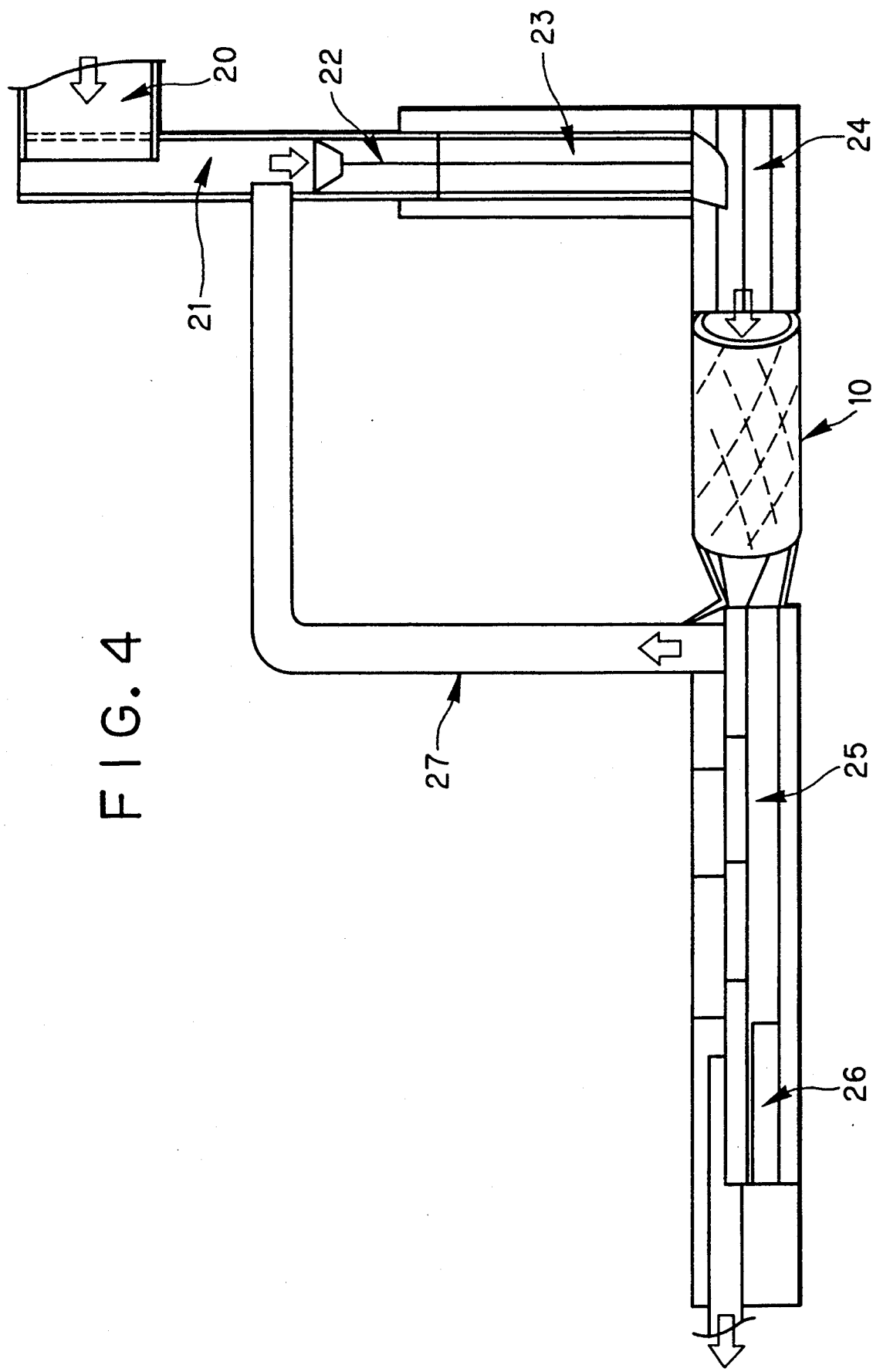
FIG. 4 schematically shows the overall construction of a feeder for film packages, according to the preferred embodiment, which includes the conveyer and the aligning apparatus shown in FIGS. 1 to 3.

FIG. 4 schematically shows a feeder for separating a pile of units 3, and serially feeding the individual units 3 in the same posture to a disassembling section (not illustrated). The feeder has a belt conveyer 21 with side fences, a reception conveyer 22, an upward conveyer 23, a conveyer 24, a first aligning apparatus 10 having the above-described construction, a conveyer 25 and a second aligning apparatus 26. Further, a feedback conveyer 27 is provided to connect the conveyer 25 to the belt conveyer 21 with fences.

Figure 5:
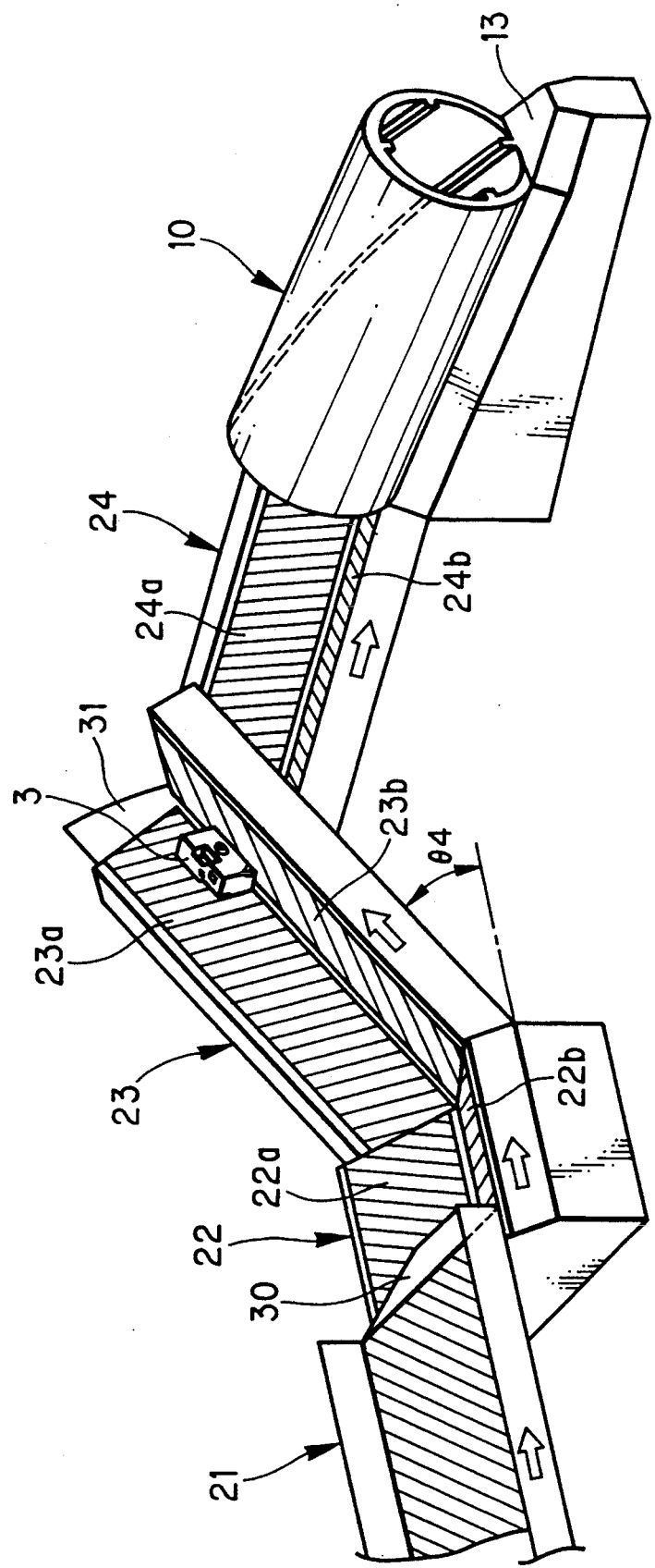
FIG. 5 is a perspective view of a conveying section of the feeder for FIG. 4 for conveying the film packages to the aligning apparatus shown in FIG. 3.

FIG. 5 shows an enlarged view of the above described conveyers 21, 22, 23 and 24 and the first aligning apparatus 10. The feedback conveyer 27 is omitted from FIG. 5 for clarity. The belt conveyer 21 with side fences conveys a plurality of units 3 at random postures which are thrown together through a chute 20 (FIG. 4) onto the flat belt conveyer 21. The conveyers 22, 23 and 24 have the same construction as the conveyer 2 shown in FIGS. 1 and 2, and the conveying speeds of these conveyers 21 to 24 are set higher in this order from the upstream conveyer 22. The units 3 are conveyed on the flat conveyer 21 in a direction shown by an arrow so as to fall onto the reception conveyer 22 through a chute 30. Because the reception conveyer 22 conveys the units 3 faster than the flat conveyer 21, the cluster of the units 3 becomes slightly dispersed on the reception conveyer 22. Also, since the conveying speed of a pair of belts 22a and 22b of the conveyer 22 is set to be different from each other, the units 3 are further dispersed while conveyed on the conveyer 22.

The cluster of the units 3 is then transferred from the reception conveyer 22 to the upward conveyer 23. Because the conveyer 23 conveys the units 3 faster than the reception conveyer 22, the units 3 of the cluster are further separated from one another. Also, since the upward conveyer 23 is inclined at an angle $\ominus 4$, e.g. 45°, to the horizontal to convey the units 3 upwards, any units 3 lying on other units 3 will fall downward while the units 3 are conveyed upwards.

Figure 6:
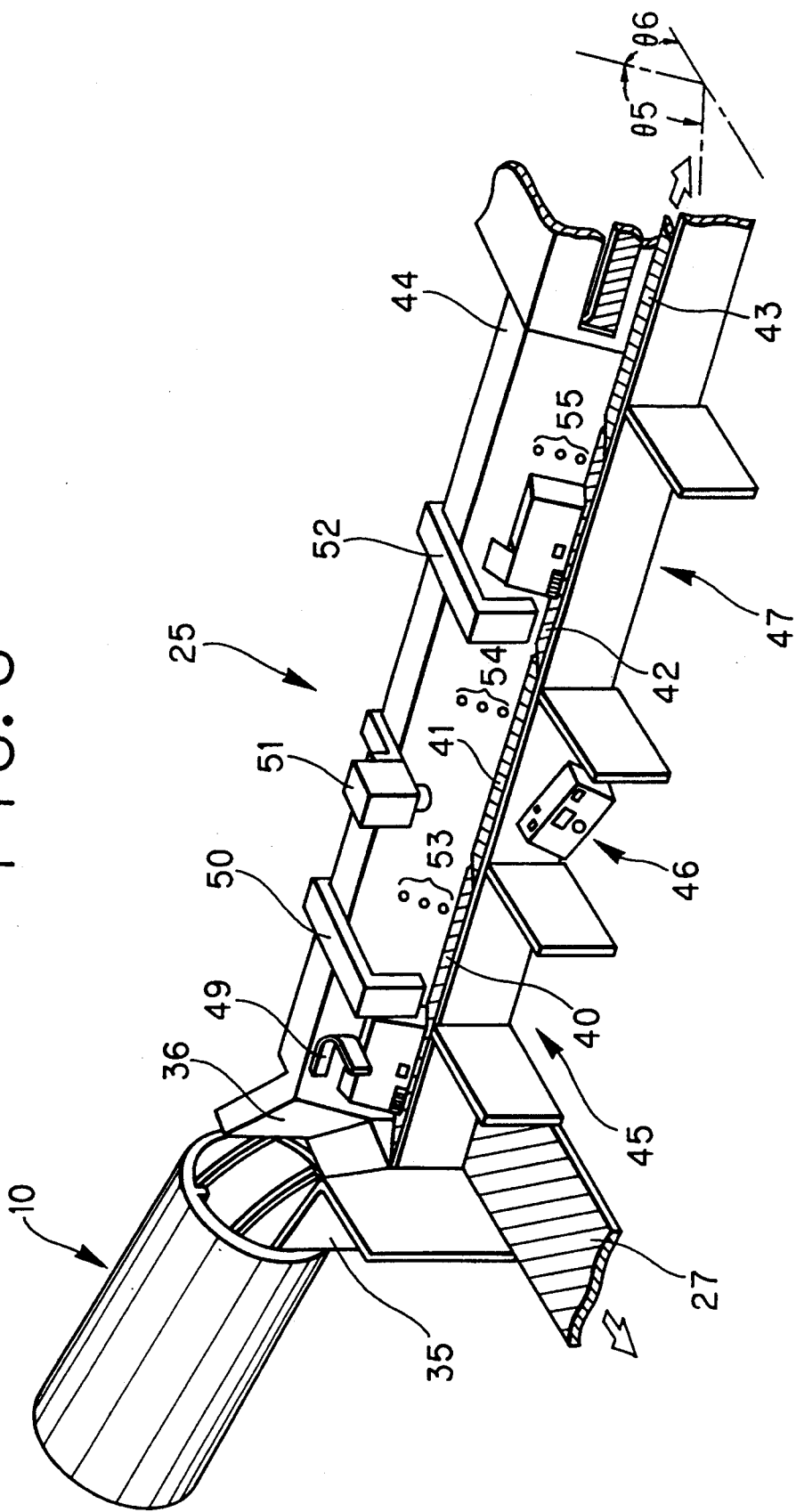
FIG. 6 is a perspective view of a sorting section of the feeder connected to the exit of the aligning apparatus according to the preferred embodiment.

The units 3 thus separated fall onto the conveyer 24 through a chute 31. Because the conveyer 24 conveys the units 3 faster than the upward conveyer 23, the units 3 are further spaced apart from one another in this stage. Thereafter, the units 3 are seriatim thrown into the aligning apparatus 10 and slide along the ridges 16 to the sloped surface 13 of the aligning apparatus 10. The sloped surface is connected to the conveyer 25. As shown in detail in FIG. 6, the sloped surface 13 is provided with a pair of fences 35 and 36 for guiding the units 3 to be placed on the conveyer 25 with the longitudinal direction of the units 3 in alignment with that of the conveyer 25.

The conveyer 25 is constituted of four serially disposed flat belts 40, 41, 42 and 43 and a stationary guide plate 44 which meet with these belts 40 to 43 at one lateral thereof to form a V-shaped bearing gutter. Because one side of the unit 3 is slid on the guide plate 44 while the unit 3 is conveyed on the four belts 40 to 43, the guide plate 44 must have a smooth surface made of plastic resin, for example.

On the lateral side of the belts 40 to 43 opposite from the guide plate 44, there are provided the feedback conveyer 27 and three discharge chutes 45, 46 and 47 for discharging units 3 that are unsuitable for the present feeder. A put-out arm 49 and first, second and third sensors 50, 51 and 52 are disposed on the guide plate 44 in correspondence with the feedback conveyer 27 and the discharge chutes 45 to 47, respectively, and air jet nozzles 53, 54 and 55 are formed in the guide plate 44 proximate the respective sensors 50 to 52.

By virtue of the put-out arm 49, if any unit 3 lies on another unit 3 when these units 3 slide from the aligning apparatus, the upper unit 3 strikes against the put-out arm 49 is pushed onto the feedback conveyer 27. The first sensor 50 detects those units 3 whose cardboard cases are irregularly torn open. For instance, if a part of the cardboard case other than a predetermined part for film cassette removal is broken, the air jet nozzle 53 blows such units 3 from the flat belt 40 to the discharge shoot 45.

The second sensor 51 detects those units 3 which were not manufactured by a predetermined manufacturer, and the air jet nozzle 54 blows these units 3 off the belts 41 to the discharge shoot 46. The third sensor 52 detects deformed units 3, and the air jet nozzle 55 blows these units 3 off the belt 42 to the discharge shoot 47. The flat belts 40 to 43 may have a width approximately equal to the width of the top or bottom side of the unit 3, or less than that value as long as the stability of conveying is not affected, to facilitate blowing the units 3 off the conveyer 25. The conveying speeds of the belts 40 to 43 are set faster in this order from the upstream. Therefore, the distance between the units 3 are further spaced apart in the conveying direction. The sensors 50, 51 and 52 can be configured in a known manner to discriminate characteristics of the units 3. It is possible to provide a space for passing a spot light beam of a photosensor between two of the flat belts 40 to 43 to detect desired characteristics or position of units 3.

Figure 7:
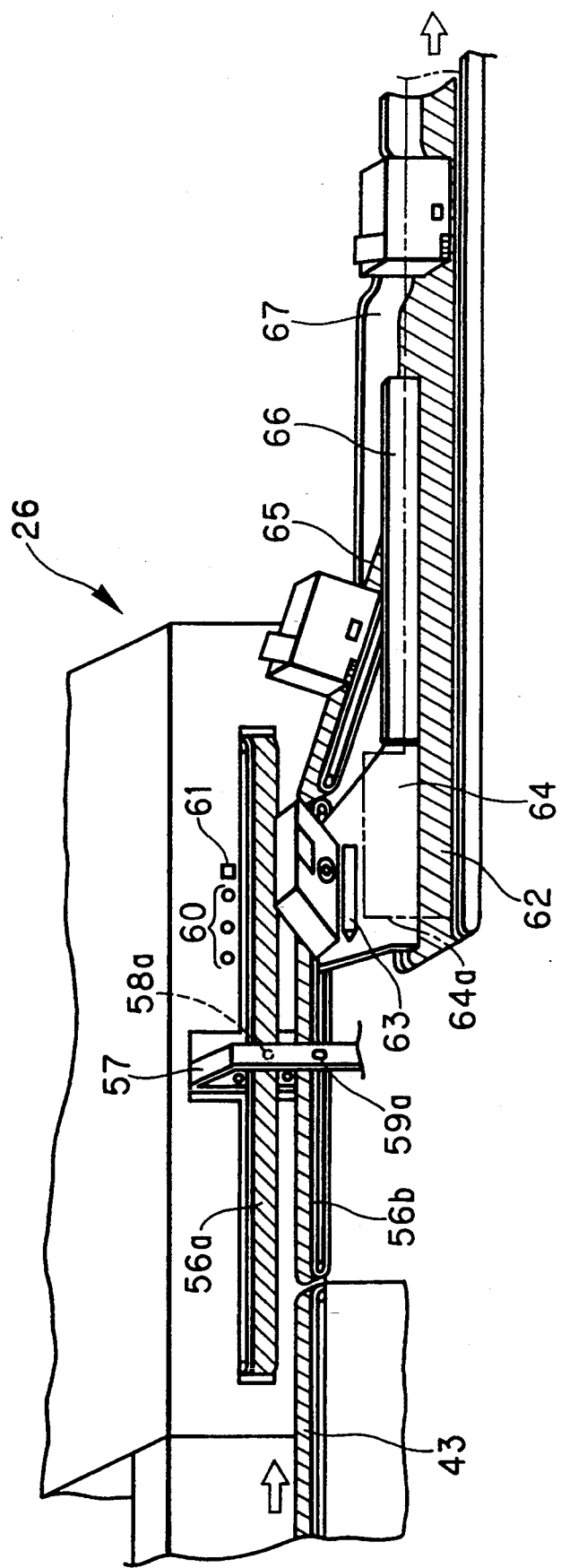
FIG. 7 is a perspective view of a section of the feeder disposed after the sorting section of FIG. 6 for placing all the film packages in an upside-down posture and feeding these film packages in series to a disassembling section according to the preferred embodiment.
Figure 8:
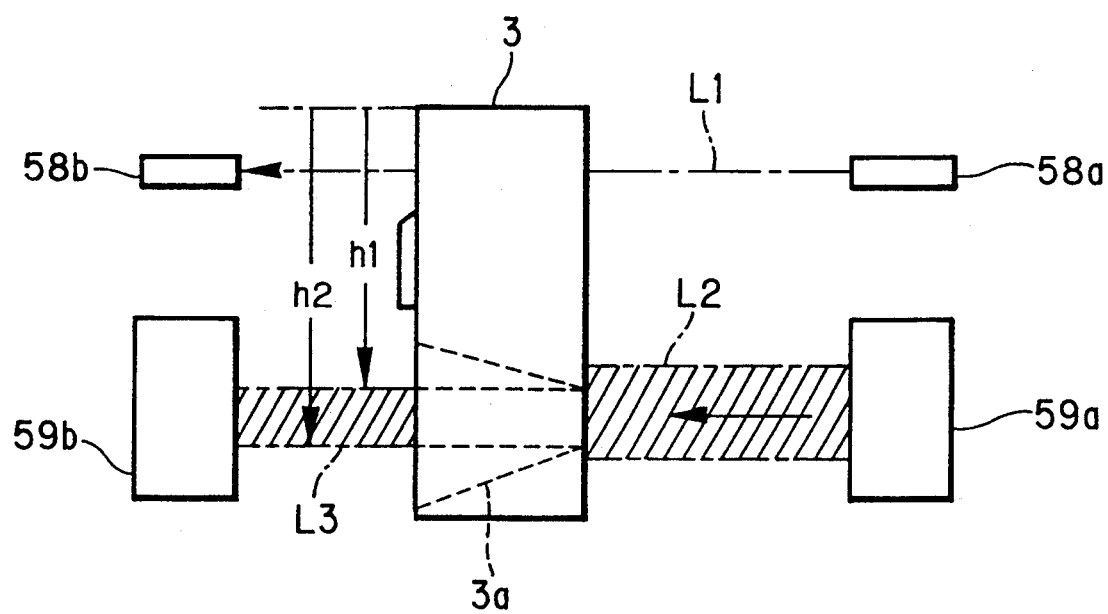
FIG. 8 is an explanatory view of a posture discriminator provided in the section shown in FIG. 7 according to the preferred embodiment.

FIG. 7 shows the second aligning apparatus 26 disposed after the flat belt 43 to discriminate between the upright posture and the upside-down posture of the units 3, overturn those units 3 having the upright posture, and thereafter, align the units 3 in a single line. In FIG. 7, a pair of flat belts 56a and 56b define a V-shaped bearing gutter as described with reference to FIGS. 1 and 2. A posture discriminator 57 is disposed at a middle portion of the flat belt 56a. The posture discriminator 57 includes two photosensors each constituted of a light emitting portion 58a/59a and a light receiving portion 58b/59b. One pair 58a and 58b constitutes a body sensor for detecting each unit 3 passing therethrough, whereas the other pair 59a and 59b constitutes a viewfinder sensor for detecting a viewfinder 3a formed in each unit 3 and extending from the front to the rear thereof (See FIG. 8).

Figure 9:
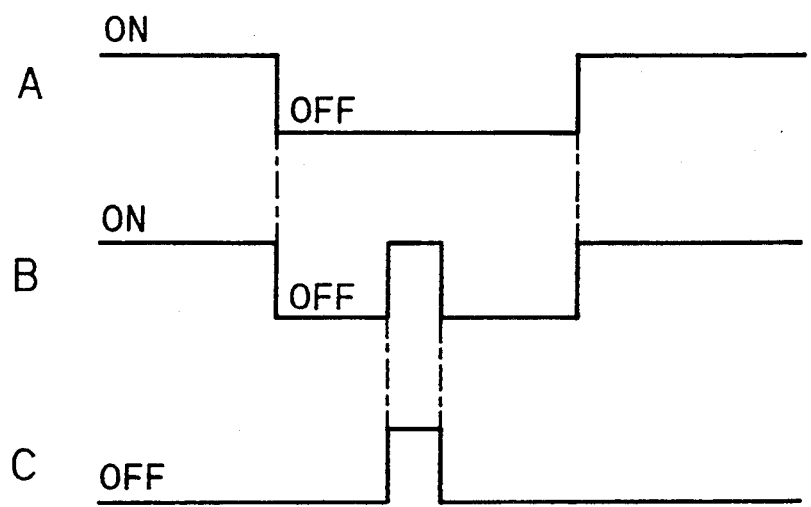
FIG. 9 illustrates timing charts of signals detected by the posture discriminator of FIG. 8.

The light emitting portion 58a of the body sensor emits a spot light beam L1 toward the light receiving portion 58b disposed on the opposite lateral side of the belt 56b. The light emitting portion 59a emits slit light L2 having a vertical width of 10 mm toward the light receiving portion 59b which is also disposed on the opposite lateral sides of the belt 56b. As shown in FIG. 99, an output signal A from the light receiving portion 58b is switched OFF when the spot light beam L1 is shielded by the unit 3. An output signal B from the light receiving portion 59b is switched ON upon receipt of slit light L3 which is a portion of the slit light L2 having traveled through the viewfinder 3a. That is, if the light L2 passes through the viewfinder 3a while the body is between light emitting portion 58a and light receiving portion 58b, the unit has an upside-down posture. A detection signal C is obtained by a combination of these output signals A and B as illustrated in FIG. 9. In other words, when signal A is off and signal B is on, signal C is in an on state.

Meanwhile, the viewfinders of the film packages are different in position as well as in size according to the type of units, such as panoramic, telephoto type and so forth, even between the film packages of the same manufacturer. As shown in FIG. 10, lock-in windows of the viewfinders of the different types of film packages are disposed in a range from h1 to h2 in height. That is, the distances h1 and h2 of the lower and upper margins of the viewfinder from the bottom of the film package vary according to the type and also depending upon whether or not the recovered film package is encased in a cardboard case. Such variations are shown for eight examples D to K in FIG. 10. In this instance, the width of the slit light L2 from the light emitting portion 59a must be about 9 mm or more in order to cover a range from the least value of the height h1 to the largest value of the height h2. On the other hand, the light receiving portion 59b is required to detect light at least in a range indicated by L4 (which is defined by the lowest upper dimension of a viewfinder and the highest lower dimension of a viewfinder) in FIG. 10. In the embodiment shown in FIG. 8, the light receiving portion 59b can receive light in the same vertical range as the slit light L2. The light receiving portion 59b may be a linear or area image sensor. Thereby, it is possible to determine the types of the unit 3 with reference to the width and height of the received slit light L3.

An air jet nozzle array 60 is disposed after the posture discriminator 57 (see FIG. 7). The air jet nozzle array 60 blows air against an upper portion of the unit 3 when a photosensor 61 detects the unit 3 and the posture discriminator 57 did not output the detection signal for this unit 3, that is, when the unit 3 has an upright posture. Thereby, the unit 3 having the upright posture is overturned to fall from the flat belt 56b. A wide flat belt 62 is disposed below the flat belt 56b to receive the unit 3 from the flat belt 56b and convey the same in a direction substantially parallel to the flat belt 56b, as shown by an arrow in FIG. 7. A guide bridge 64 for guiding the units 3 from the flat belt 56b to the wide flat belt 62 has a ridge 63 extending in parallel to the conveying direction in a middle of the guide bridge 64. The unit 3 that has been blown off the flat belt 56b stumbles over the ridge 63 and falls headlong on the guide bridge 64 to the flat belt 62. As indicated by the phantom line, a fence 64a is provided for preventing the units 33 from dropping off of the flat belt 62.

The lower end of the guide bridge 64 is centrally disposed over the center of the flat belt 62 and a partition wall 66 is provided immediately after and in alignment with the lower end of the guide bridge 64, to partition the flat belt 62 into two lines. The units 3 having fallen along the guide bridge 64 are conveyed on the line before the partition wall 66 in FIG. 7. On the other hand, the belt 56b is connected in series to a downward conveyer 65, which conveys those units 3 which have caused the posture discriminator 57 to output the detection signal, toward the lower flat belt 62, while maintaining the upside-down posture of these units 3 unchanged. The units 3 transferred from the downward belt 65 to the lower flat belt 62 are conveyed along the line behind the partition wall 66, in FIG. 7. These units 3 eventually run into a joint guide 67, thereby, to be joined into the same line as the units 3 having been conveyed along the line before the partition wall 66. In this way, the units 3 divided at the air jet nozzle 60 into two lines are again aligned in the same upside-down posture.

It may be possible to perform discrimination between the upright posture and the upside-down posture based upon detection of the vertical position of a taking lens or any other element of the film package as long as the distance of that element from the bottom of the film package is not equal to the distance from the top.

Now, the operation of the feeder constructed as set forth above will be described.

The units 3, or used film packages from which exposed films have been removed, are collected from the photofinishing laboratories to be sent to a factory for recycling. In the factory, a cluster of units 3 are thrown through the shoot 20 onto the belt conveyer 21 and are conveyed thereon in a pile with random postures. The pile of the units 3 are tumbled into individual pieces 3 while conveyed on the conveyers 22 to 24. The separate units 3 are slid through the first aligning apparatus 10, so that the longitudinal direction of each unit 3 is aligned with the conveying direction. Thereafter, while conveyed on the conveyor 25, the units 3 are inspected by the first to third sensors 50 to 52 to eliminate unsuitable units 3 and pass suitable units 3 to the second aligning apparatus 26.

In the second aligning apparatus 26, the posture discriminator 57 determines the posture of each unit 3 borne on the belt 56b. If the viewfinder 3a is located in the upper portion of the unit 3, the unit 3 is blown off the belt 56b to fall headlong onto the lower belt 62. If the viewfinder 3a is located in the lower portion of the unit 33, the unit 3 is not overturned and is conveyed through the downward conveyer 65 to the lower belt 62. Thereafter, these non-inverted units 3 are guided by the joint guide 67 to be inserted between the inverted units 3. In this way, all the units 3 having passed through the conveyer 26 are placed in the upside-down posture and aligned.

The units 3 are then sent to a disassembling section (not illustrated), wherein first a stationary knife is inserted into the moving unit 3 to peel off a pasted flap of the cardboard case and remove the case off the package body. Thereafter, the front cover section, the lens unit, the shutter unit and/or the printed circuit board are detached from the main body section. The lens unit, the shutter unit and the printed circuit board are reassembled after necessary inspections. The front cover section, the main body section and the rear cover section are melted to be reused as resin material.

An example of the preferred embodiment was constructed. The flat belts 4 and 5 of the conveyer 2 of the example are made of polyester fiber impregnated with urethane rubber. The angle $\ominus 1$ between the bearing surfaces 4a and 5a of the belts 4 and 5 is 90°, while the inclination angle $\ominus 2$ of the bearing surface 5a to horizontal is 45°. The angle $\ominus 4$ of the upward conveyer 23 is set at 45°. These features were selected based on the result of several tests. The width of the flat belts 22a and 22b is 75 mm, and the width of the flat belts 23a and 23b is 100 mm. The respective conveying speeds of the conveyer 22, 23 and 24 are set as follows:

| belt 22a 16.5 m/minute, | belt 22b 15.0 m/minute |
|---|---|
| belt 23a 19.5 m/minute, | belt 23b 18.0 m/minute |
| belt 24a 26.5 m/minute, | belt 24b 33.0 m/minute |

The cylindrical tube 11 of the aligning apparatus 10 is made of polyvinyl chloride, and is 400 mm in external diameter, 10 mm in thick and 1 m in length. The inclination angle $\ominus 3$ of the tube 11 is 10° and the rotational speed of the tube 11 is 18.5 m/minute. The throughput capacity of the aligning apparatus 10 constructed as above was about 100 pieces/minute. In this instance, the works processed by the aligning apparatus 10 were recovered units of various types of various manufactures whose dimensions and weight were included in the following ranges:

| LENGTH | HEIGHT | THICKNESS | WEIGHT |
|---|---|---|---|
| 97 to 130 mm | 57 to 60 mm | 29 to 50 mm | 50 to 130 g |

In the conveyer 25 of the example the four flat belts 40 to 43 are rubber V belts with fiber core having a length of 400 to 600 mm and a width of 27 mm. The stationary guide plate 44 is made of slipping resin (DURACON: trademark) having a thickness of 4 mm and a width of 200 mm. The angle $\ominus 5$ of the V-shaped gutter of the conveyer 25 is 90°, while the inclination angle $\ominus 6$ of the guide plate 44 to horizontal is 60°. The belts 56a, 56b and 65 of the example are also rubber V belts with fiber core like the belts 40 to 43, whereas the belt 62 is made of polyester fiber impregnated with urethane rubber like the belt 21, and has a width of 100 nm. The respective conveying speeds of the above flat belts are as follows:

belt 40 . . . 36.5 m/minute
belt 41 . . . 41.0 m/minute
belt 42 . . . 46.0 m/minute
belt 43 . . . 51.0 m/minute
belt 56b . . . 56.0 m/minute
belt 65 . . . 56.0 m/minute
belt 62 . . . 78.0 m/minute Although the units 3 are blown off the belt conveyers by means of the air jet nozzles in the above embodiment, it is possible to push the units 3 down by means of pins or levers actuated by cylinders, electromagnetic solenoids, cams or the like. Thus, the present invention is not to be limited to the above-described embodiments, but on the contrary, various modifications may be possible without departing from the scope of the appended claims.

What is claimed is:

1. An aligning apparatus for objects having substantially rectangular box shapes comprising:

a cylindrical tube, said tube being inclined to dispose a first end at a position which is higher than a second end of said tube, said first end of said tube defining an entrance for receiving a plurality of said objects at random posture, said second end of said tube defining an exit for ejecting said objects;

means for rotating said tube about a longitudinal axis of said tube;

at least one ridge formed on an internal peripheral surface of said tube and extending from said entrance to said exit, for guiding said objects while said objects slide downward through said rotating tube, to bring a longitudinal direction of each of said objects into alignment with the longitudinal axis of said tube when each of said objects reaches said exit;

first, second and third conveyor devices for conveying said objects to or from said tube, each of said conveyer devices comprising first and second bearing surfaces inclined at 45° with respect to horizontal, for bearing said objects thereon, said first and second bearing surfaces extending parallel to each other and being laterally inclined relative to a horizontal so as to meet with each other, at respective lateral sides thereof, at a first angle of 90°, said first and second bearing surfaces being flat belts;

driver means for driving said first and second bearing surfaces independently from each other to convey said objects in a first direction;

said first conveyer device having two bearing surfaces which are respectively moved at speeds of 16.5 and 15.0 m/minutes by said driving means, said second conveyer device having two bearing surfaces which are respectively moved at speeds of 19.5 and 18.0 m/minutes, by said driving means, and said third conveyer device having two bearing surfaces which are respectively moved at speeds of 26.5 and 33.0 m/minutes by said driving means, said first to third conveyer devices being connected in series in this order from an upstream position to redundantly space apart said objects while said objects are conveyed on said three conveyer devices.

2. An aligning apparatus as recited in claim 1, wherein said rotating means comprises a base portion for rotatably mounting said tube thereon, a motor mounted in said base portion for driving said tube, and a transmission device for transmitting rotational movement of said motor to said tube.

3. An aligning apparatus as recited in claim 1, wherein said ridge extends in a spiral manner through said tube.

4. An aligning apparatus as recited in claim 3, wherein a plurality of said ridges are formed in parallel with one another on said internal peripheral surface.

5. An aligning apparatus as recited in claim 1, wherein said first bearing surface is constituted of at least an endless belt driven to convey said objects, and said second bearing surface is a stationary guide surface.

6. An aligning apparatus as recited in claim 1, wherein said driver means drives said first bearing surface at a conveying speed which is different from that of said second bearing surface.

7. An aligning apparatus for objects having substantially rectangular box shapes comprising:

a cylindrical tube, said tube being inclined to dispose a first end at a position which is higher than a second end of said tube, said first end of said tube defining an entrance for receiving a plurality of said objects at random posture, said second end of said tube defining an exit for ejecting said objects;

means for rotating said tube about a longitudinal axis of said tube; and at least one ridge formed on an internal peripheral surface of said tube and extending from said entrance to said exit, for guiding said objects while said objects slide downward through said rotating tube, to bring a longitudinal direction of each of said objects into alignment with the longitudinal axis of said tube when each of said objects reaches said exit.

a first conveying device connected to said exit of said tube so as to convey said objects in series in a first direction said first conveying device comprises first and second bearing surfaces for bearing said objects thereon, said first and second bearing surfaces extending parallel to each other and being laterally inclined relative to horizontal so as to meet at one respective lateral side thereof with each other at an angle of less than 180°, at least one of said bearing surfaces having a width which is less than a width of a top or bottom or side of each of said objects;

discriminating means disposed on said first conveying path for discriminating said objects vertically between an upright posture and an upside down posture which is inverted relative to said upright posture on said first conveying path;

inverting means comprising an air jet nozzle disposed after said discriminating means for inverting those objects having said upside-down posture to have said upright posture by causing each object having said upside-down posture to fall headlong to one lateral side of said first conveying device;

a second conveying device extending below and along said first conveying device so as to receive said objects which have been inverted to have said upright posture from said first conveying device, and convey said inverted objects which have been inverted in said first direction, said second conveying device joining said first conveying device at a position which is downstream from said inverting means; and guide means disposed proximate said downstream position for guiding each object conveyed on one of said first and second conveying devices into the other conveying of said first and second devices so as to bring said separately conveyed objects having said second posture into a single line.

8. An aligning apparatus as recited in claim 7, wherein said first bearing surface comprises at least an endless belt driven to convey said objects in said first direction, and said second bearing surface is a stationary guide surface.

9. An aligning apparatus as recited in claim 7, wherein each of said first and second bearing surfaces comprises at least an endless belt driven to convey said objects in said first direction.

10. An aligning apparatus as recited in claim 7, wherein said objects are various types of lens-fitted photographic film packages each of which has a viewfinder formed therethrough in an upper portion thereof.

11. An aligning apparatus as recited in claim 10, wherein said discriminating means comprises a first photosensor which detects each of said lens-fitted photographic film packages passing said discriminating means, and a second photosensor which detects the viewfinder of a lens-fitted photographic film package which have the upside-down posture.

12. An aligning apparatus as recited in claim 11, wherein said second photosensor includes a light emitting element emitting a focused light beam and a light receiving element disposed on opposite lateral sides of said first conveying path.

* * * * *